United States Patent Office 3,466,299
Patented Sept. 9, 1969

3,466,299
DIOXANE COMPLEXES OF LOWER ALKANOLS
AND MAGNESIUM HALIDES
Ulrich W. Weissenberg, Midland, Mich., assignor to The
Dow Chemical Company, Midland, Mich., a corporation of Delaware
No Drawing. Original application Oct. 31, 1966, Ser. No.
590,521. Divided and this application Aug. 14, 1968,
Ser. No. 770,880
Int. Cl. C07d *17/00;* C07f *3/02*
U.S. Cl. 260—340.6                                4 Claims

ABSTRACT OF THE DISCLOSURE

This invention relates to a new complex of magnesium halides, particularly halides of halogens having an atomic weight above 35, containing alcohol and cyclic ether molecules, and to a method for preparing such magnesium halides of high purity from the complexes, and more particularly pertains to complexes of such magnesium halides containing both a low molecular weight monohydric alkanol and a cycloaliphatic ether as solvate molecules, and to a method of preparing a magnesium halide of high purity by removing the solvating organic molecules at an elevated temperature.

---

This application is a division of Ser. No. 590,521, filed Oct. 31, 1966.

Numerous attempts have been made to produce anhydrous magnesium halides which contain less than 1 percent water and only small amounts of oxides, but no feasible process attempted heretofore has been very successful.

Chlorides, bromides and iodides of magnesium obtained by crystallization from water solution are invariably hydrates. On heating these hydrates, there can be a complete or partial reversion, so that considerable amounts of magnesium oxide and/or magnesium oxyhalide are formed. This reversion can be suppressed to a considerable degree by heating the hydrates in an atmosphere of dry HCl, which is expensive and requires corrosion resistant apparatus for proper functioning.

The magnesium halide hydrates can be converted to ammonium carnallite which then can be heated in a two stage pyrolysic to temperatures of 350° C. or higher to sublime the ammonium halide. This process suffers from the disadvantage that the magnesium halide must first be converted to the carnallite, and from the fact that the sublimation is a slow reaction.

Alcoholates of magnesium halides can be obtained directly from naturally occuring alkali metal carnallites, particularly potassium carnallite, by leaching the latter mineral with a liquid anhydrous alcohol. On heating the magnesium halide-alcohol complex, however, severe decomposition of both the organic compound and the magnesium halide occurs, so that the end product contains relatively large amounts of carbon and magnesium oxide.

I have found that by adding a cycloaliphatic ether to a liquid monohydric alkanol solution of a magnesium chloride, bromide or iodide, a complex containing both the alcohol and ether is formed with the magnesium halide at room temperature. The complex is insoluble in the alcohol and in the ether in the proportions of those solvents employed and can be readily removed from the supernatant liquid by decantation, filtration or centrifuging. On heating the magnesium halide-alcohol-cycloaliphatic ether complex, it was surprisingly found that the alcohol appears to desolvate more easily than the cycloaliphatic ether. On further desolvation, the cycloaliphatic ether is volatilized without appreciable reversion of the magnesium halide. The desolvation of the alcohol depends largely on the alcohol used. With ethanol, this effect can be noticed at a temperature as low as 25° C., particularly under vacuum. The ether is desolvated at an elevated temperature, usually 200–300° C., preferably under vacuum.

The alcohols which can be used for dissolving the magnesium halide are monohydric alkanols which are liquid at room temperature. They can have from 1 to 3 carbon atoms in the alkyl group. The alcohol can be primary or secondary, so long as it does not split out water at temperatures up to about 150° C. The preferred alkanols are methanol and ethanol and mixtures thereof.

The cycloaliphatic ethers can be tetrahydrofurane, dioxane and lower alkyl derivatives thereof. The term "lower alkyl" is intended to mean a group of from 1 to about 4 carbon atoms. These ethers have from 5 to 6 atoms in the cyclic ring and 1 to 2 oxygen atoms in the ring. The only limitation on the type of alkyl substitution and the number of alkyl groups on the ring is that it should be so great as to increase the boiling point of the ether above about 100° C., and that it does not decompose with the formation of water or alcohols at its boiling point. The dioxanes can be 1,3- or 1,4-.

The magnesium halides which can be reacted and purified include magnesium iodide, magnesium bromide and magnesium chloride. The preferred magnesium halide is magnesium chloride, because of its abundance, industrial importance and potentially low cost. The magnesium halide can be an alcoholate dissolved in alcohol or a solution of the salt in a monohydric alkanol of the type described.

In the preparation of the solution of the magnesium halide and in all subsequent treatments, it is essential to maintain all ingredients as far from water or water vapor as is practical. Thus, the alcohol used for preparing the solution of the magnesium halide and the cycloaliphatic ether should be of at least commercial anhydrous grade. The recovery step for separating the magnesium halide-alcohol-cyclic ether complex should be carried out with a minimum exposure to moist atmospheres, and the final desolvating of the cycloaliphatic ether should also be effected in a substantially moisture-free atmosphere and preferably under vacuum at 200–300° C.

The ratio of alcohol to cycloaliphatic ether is not critical, but it is desirable to have sufficient ether present to form complexes of the magnesium halides having at least one mol of alcohol per mol of magnesium salt. Preferably, the molar ratio of alcohol to the cyclic ether is from about 1 to 1 to about 20 to 1. Such complexes are not very soluble in the alcohol-ether mixture, and thus, will precipitate from the liquid.

The complexes which form contain at least 0.2 mol of ether per mol of magnesium salt, and for this reason, the molar ratio of Mg. salt to cyclic ether should be at least 0.2 to 1 and preferably about 1 to 1 to 2 to 1.

Representative alcohols which can be used for dissolving the magnesium halide include methanol, ethanol, n-propanol and isopropanol.

Typical cyclic ethers which can be used for the formation of complexes are dioxane, tetrahydrofuran, and their alkyl or phenyl substituted derivatives. The preferred ether is dioxane.

The examples which follow are intended to illustrate, but not to limit, the invention. Parts are by weight, unless otherwise specifically indicated.

EXAMPLE 1

A saturated solution of $MgCl_2$ in absolute methanol, obtainable by extracting potassium carnallite with anhydrous methanol, consisting of about 15 g. $MgCl_2$ and about 123 g. methanol, was added rapidly with vigorous stirring at room temperature to 345 g. of absolute 1,4-dioxane. A white precipitate settled out immediately. After permitting the solids to settle for several hours, the precipitate was filtered with the exclusion of atmospheric moisture and then subjected at a vacuum of 200 mm. Hg for 5 hours. The residue weighed 37.9 grams. On analysis, it was shown to have the composition $MgCl_2 \cdot 1$ dioxane$\cdot 3$ methanol.

The product is very deliquescent and tends to liberate methanol preferentially when heated under vacuum. At a final temperature of 290–300° C. and 50–100 mm. Hg vacuum, total desolvation occurs. The $MgCl_2$ contains only about 1.6 to about 2 percent MgO as impurity. Only minute traces of carbon were observed.

For comparative purposes, under essentially the same conditions, $MgCl_2$ methanolate, initially containing 6 mols $CH_3OH$ as a ligand, yielded a product having about 25 percent MgO and about 6 percent carbon.

EXAMPLE 2

To an $MgCl_2$ solution, obtainable by extracting potassium carnallite with absolute ethanol, and containing 3 g. $MgCl_2$ in 74 g. of the ethanol, were added 145 g. of absolute 1,4-dioxane at room temperature. Crystals began to form after about 2 hours. The mixture was allowed to stand overnight and then filtered while excluding atmospheric moisture. The crystals were washed several times with absolute dioxane and held at 200 mm. Hg pressure for ten minutes. Analytical data showed that a composition of $MgCl_2 \cdot 1 \cdot 8$ ethanol$\cdot 2$ dioxane can be recovered. On heating the biligandic $MgCl_2$ compound in a vacuum to 80–90° C., $MgCl_2 \cdot 2$ dioxanate is obtained. Additional heating of the dioxanate under a vacuum of 50–100 mm. Hg at 290–300° C. yields $MgCl_2$ with less than 0.5 percent MgO as an impurity.

The $MgCl_2 \cdot 6$ $C_2H_5OH$ compound when heated under substantially the same conditions produces about as much MgO and carbon contaminants as that formed from the corresponding methanol complex.

The dioxanate of n-propyl and isopropyl alcohol solutions of $MgCl_2$ may be used for preparing biligandic complexes containing either the propanol or isopropanol and dioxane. As is the case with the ethanol and methanol complexes, the three carbon alcohols are preferentially removed from the complex, so that the dioxanate can be prepared and this then can be desolvated to form $MgCl_2$ with only small amounts of MgO contaminants and at most small traces of carbon.

Similar results are obtained with tetrahydrofuran and the other cyclic ethers mentioned above.

$MgI_2$ and $MgBr_2$ solutions in absolute alkanols of from 1 to 3 carbon atoms can be used for preparing biligands which can be converted to dioxanates and further desolvated to pure magnesium halides.

EXAMPLE 3

In a series of runs, various proportions of magnesium chloride were dissolved in methanol. The amount of dioxane added to precipitate the biligand of the magnesium salt in relation to the amount of methanol present was also varied. In Table I below, the percentage of magnesium is based on the Mg content of $MgCl_2$.

TABLE I.—METHANOL, DIOXANE SOLVATES OF MAGNESIUM CHLORIDE MOLAR COMPONENT RATIOS OF PREPARED SAMPLES

| Sample Run: | Wt. percent, Mg | Wt. percent, 1,4-dioxane | Wt. percent, methanol | Molar ratio, dioxane-MeOH | Molar ratio mg-diox.-MeOH: |
|---|---|---|---|---|---|
| 1 | 5.39 | 6.5 | 49 | 1.00-20.7 | 1.00-0.33-6.9 |
| 2 | 6.73 | 18 | 46 | 1.00-7.05 | 1.00-0.73-5.2 |
| 3 | 7.56 | 7.3 | 50 | 1.00-18.8 | 1.00-0.27-5.0 |
| 4 | 9.02 | 28 | 32 | 1.00-3.14 | 1.00-1.02-3.18 |

When these complexes were subjected to heat treatment, the methanol in the complex was preferentially released and continued heating to 290–300° C. liberated all of the solvent to produce a magnesium chloride with a relatively low magnesium oxide contaminant.

Similar tests were run with ethanol. In this instance, however, the amount of magnesium chloride is recorded as percent by weight of salt. Data obtained with the ethanol containing complexes are listed in Table II.

In run 1, the analyses were made on a precipitate which was subjected to a vacuum of 100 microns of mercury at room temperature for ten minutes. The sample in run 2 was analyzed after a heat treatment of 45 minutes at 80–90° C. under vacuum of 50 microns of mercury. These data clearly show that the ethanol in the biligand is rapidly removed from the complex under relatively mild conditions. Continued heating of the biligand eventually results in the formation of the dioxanate of the magnesium chloride, which in turn is completely desolvated at temperatures of from about 200–300° C. preferentially under vacuum in 10 to 20 minutes.

TABLE II.—ETHANOL, DIOXANE SOLVATES OF MAGNESIUM CHLORIDE: APPROX. MOLAR RATIOS OF PREPARED SAMPLES

| Sample Run: | Wt. percent, $MgCl_2$ | Wt. percent, 1,4-dioxane | Wt. percent, ethanol | Molar ratio, dioxane-E+OH | Molar ratio, $MgCl_2$-dioxane-E+OH |
|---|---|---|---|---|---|
| 1 | 27.5 | 46 | 26.5 | Ca. 1.00-1.10 | Ca. 1.00-1.81-2.00 |
| 2 | 45 | 49 | 2.9 | Ca. 1.00-0.16 | Ca. 1.00-1.24-0.19 |

I claim:
1. A biligand of a magnesium halide in which the halide has an atomic weight of 35 and above and said biligand consists of 1 to 3 mols of an alkanol of from 1 to 3 carbon atoms and 1 to 2 mols of a cycloaliphatic ether selected from the group consisting of 1,4-dioxane, 1,3-dioxane and tetrahydro-furan.
2. A biligand of claim 1 having the composition $MgCl_2 \cdot 3CH_3OH \cdot 1$ dioxane.
3. A biligand of claim 1 having the composition of $MgCl_2 \cdot 2CH_5OH \cdot 2$ dioxane.
4. The composition of claim 1 in which the cyclic ether is dioxane.

References Cited

Esafor, "Zhur. Obshchei Khim," vol. 28, 1958, pp. 1212–21.

ALEX MAZEL, Primary Examiner

J. H. TURNIPSEED, Assistant Examiner

U.S. Cl. X.R.

23—91; 260—340.7, 340.9, 345.1, 346.1